United States Patent Office 3,139,457
Patented June 30, 1964

3,139,457
PRODUCTION OF VICINAL AMINO ALCOHOLS
Seymour J. Lapporte, Berkeley, and Louis L. Ferstandig, El Cerrito, Calif., assignors to California Research Corporation, San Francisco, Calif., a corporation of Delaware
No Drawing. Filed Aug. 15, 1960, Ser. No. 49,415
6 Claims. (Cl. 260—584)

The present invention relates to the preparation of vicinal amino alcohols, such as ethanolamine, having 2 to 12 carbon atoms in the molecule. More particularly, the invention has to do with the preparation of the aforesaid amino alcohols from the corresponding vicinal chlorohydrin acetate of the olefins by ammonolysis with aqueous ammonia.

The amino alcohols prepared in accordance with the invention are important intermediates in chemical synthesis, and are useful as non-ionic detergents by reaction with ethylene oxide; as anionic detergents by sulfation either preceding or after reaction with ethylene oxide; in lime soap dispersant formulations; as foam stabilizers for anionic detergents; and as wetting agents. Further, these materials may also be used in lube oil additives or as reactive diluents for reducing the viscosity of epoxy resins.

Broadly, the present invention is based on the surprising discovery that ammonolysis of chlorohydrin acetates of olefins having 2 to 12 carbon atoms, such as ethylene chlorohydrin acetate or dodecene-1 chlorohydrin acetate, in the presence of water, gives good yields of the amino alcohol. More particularly, the ammonolysis reaction employed to effect the preparation of the amino alcohol is accomplished by heating at a temperature in the range 100° to 250° C. the chlorohydrin acetate of an olefin of 2 to 12 carbon atoms with aqueous ammonia in proportions calculated to provide at least 2 mols of ammonia for each mol of the chlorohydrin acetate. In general, temperatures near the lower end of the specified range can be employed with the lower molecular weight chlorohydrin acetates, while higher temperatures are conveniently employed with the higher molecular weight materials. The upper limit with respect to the amount of ammonia is not critical, it being governed by operating and practical considerations; an upper limit of about 100 mols ammonia per mol of the chlorohydrin acetate can, however, be cited as a feasible top limit. In order to provide for the presence of water, a convenient way of proceeding is to use commercially available 28% ammonium hydroxide, i.e., a mixture of ammonia and water in weight proportions of 28% ammonia and 72% water, although, if desired, lower concentrations, i.e., down to 5% ammonia and 95% water, can be employed.

In some instances, particularly with the higher molecular weight chlorohydrin acetate, it will be found advantageous to employ an inert cosolvent, such as tetrahydrofuran, or dioxane, suitable amounts of cosolvent ranging from about 5 to 95 volume percent based on the aqueous ammonia.

The chlorohydrin acetate which can be employed in accordance with the invention can be derived from monoolefins and nonconjugated polyolefins. They can be of straight chain structure, such as the chlorohydrin acetate of 1-octene to produce 1,2-octanol amines, or of branched chain structure, such as the chlorohydrin acetate of alpha-diisobutylene to produce mixtures of 2,4,4-trimethyl-2-amino-1-pentanol and 2,4,4-trimethyl-1-amino-2-pentanol. As indicated, the unsaturated bond can appear not only at the end of the chain, but internally, that is, between carbon atoms intermediate the terminal carbon atoms, for example, to produce 6-chloro-7-acetoxydodecane, whereby 6-amino-7-dodecanol is obtained. It is likewise immaterial where the chlorine and acetate radicals appear with respect to each other; for example, the chlorohydrin acetate can be a 1-chloro-2-acetoxyalkane or a 1-acetoxy-2-chloroalkane. Moreover, the chlorohydrin acetate can be derived from the cycloalkenes, in this latter case it being preferred that, in addition to the chlorine and acetoxy groups being vicinal, their geometric configuration be trans, for the cis isomer is relatively inert. This is a minor consideration, however, since inherently in the chloroacetoxylation of the cycloalkenes the trans form predominates. To summarize, inasmuch as the ammonolysis reaction is the same regardless of the type of olefin empolyed to produce the chlorohydrin acetate once the chlorohydrin acetate is obtained, any chlorohydrin acetate produced from a broad class of olefin falls within the purview of the invention. However, because of their ready availability, the invention has particular applicability to the chlorohydrin acetates of acyclic 1-olefins or terminal olefins advantageously obtained from the cracking of petroleum wax.

The chlorohydrin acetate of the olefin, moreover, can be prepared in known fashion, such as by reaction of equimolar quantities of chlorohydrin and acetic anhydride, catalyzed by a small amount of concentrated sulfuric acid, after reaction the acid being neutralized and the product recovered, as by distillation.

Another way of preparing the chlorohydrin acetates is in accordance with the process set forth in application Serial No. 722,995, entitled "Production of Alpha-Glycols," filed March 21, 1958, in the names of Seymour J. Lapporte and William A. Sweeney, now U.S. Patent No. 2,971,989, to which this application has particular applicability. In accordance with this application, chlorohydrin acetates are prepared by reacting appropriate olefin with chlorine in the presence of an acetate ion-donating medium, e.g., sodium acetate, under chloracetoxylation conditions. More particularly, in accordance with the aforesaid Lapporte and Sweeney application, chlorination of the olefin can be effected by contacting under chlorination temperatures olefin and chlorine in stoichiometric amounts, the olefin being dissolved in an acetate ion-donating medium, e.g., acetic acid, in an amount of 0.01 to 0.10 mol of olefin per mol of acetic acid, which may be anhydrous or aqueous, i.e., containing 2% water, a satisfactory chlorination temperature range moreover being 10–30° C. The chloracetoxylation products resulting from the chlorination step, including the olefin dichloride, the chlorohydrin acetate and the diacetate, are then subjected to a hydrolysis step in a confined zone and heated to an elevated temperature in the presence of an organic solvent and an acetate salt to produce glycols.

The present invention can be applied to the chloracetoxylated products produced as above described, replacing the hydrolysis step with the ammonolysis procedure herein contemplated. Accordingly, since the ammonolysis reaction, when proceeding in accordance with the present invention, is carried out under aqueous conditions, the acetoxylation agent employed, that is, acetic acid, need not be free from water, and for this reason, wet acetic acid can be employed as the acetoxylation reagent. Further, prior to the ammonolysis step, it is preferred to remove any unreacted acetoxylation agent, e.g., acetic acid and acetate salt, thus obviating the necessity of first having to neutralize it with the ammonia of the ammonolysis step. This can simply be removed by distillation.

Following ammonolysis of chlorohydrin acetate, whether in pure form or in crude mixture as hereinabove described, the finished amino alcohol is recovered by conventional means. That is, the ammonolysis products, after removal of any solvent, are neutralized or acidified with a suitable acid, e.g., hydrochloric acid, to solubilize the basic amino alcohols as the alkanolamine salts, an excess of acid preferably being employed to provide a pH of the ammonolysis mixture in the range 2–5. After neutralization or acidification, the mixture is extracted with a suitable solvent, e.g., chloroform, to separate the neutral organic material.

The aqueous acidic layer may then be made basic to pH 7–10 and the free amino alcohols extracted with a suitable water-immiscible organic solvent. Alternatively, the aqueous acidic extract may be concentrated by evaporation and the alkanolamine salts crystallized directly from a suitable solvent or solvent mixture, e.g., ethanol or ethanol-benzene.

The following examples illustrate the practice of the invention:

Example 1

A 200-ml. stainless steel rocker bomb was charged with 5.26 g. (0.02 mol) of dodecene-1-chlorohydrin acetate, boiling point 123–127.5° C. at 1.1. mm. $N_D^{20}=1.4458$, and 33.3 ml. (0.5 mol) of concentrated (28%) aqueous ammonia. The bomb was heated and rocked for three hours at 220° C. The maximum pressure was 380 p.s.i.g. After cooling, the reactor contents were acidified to a 10% excess with concentrated hydrochloric acid, and the solution continuously extracted with 200 ml. of chloroform for eight hours. Evaporation of the chloroform layer, followed by crystallization from pentane, gave a 70% yield of solids, melting point 53–57.4° C. Nitrogen analysis and the infrared spectrum of this material indicated that it contained 18% dodecanolamine.

Example 2

A 600-ml. stainless steel rocker bomb was charged with 13.4 g. (0.075 mol) of hexene-1-chlorohydrin acetate, boiling point 93–96° C. at 12 mm. $N_D^{20}=1.4330$, 125 ml. (1.875 mol) concentrated (28%) aqueous ammonia, and heated at 220° C. for 3.5 hours. The reactor contents were acidified to a 10% excess with concentrated hydrochloric acid and continuously extracted with chloroform. Concentration of the chloroform layer gave an oil which, upon distillation, gave 4.1 g. (53% yield) of 1,2-hexanediol and 0.90 g. of unreacted chlorohydrin acetate. The glycol was identified as its di-p-nitrobenzoate, melting point 100.2–100.8° C. Analysis found: C, 58.19; H, 4.90; N, 6.62. Calculated for $C_{20}H_{20}N_2O_8$: C, 57.69; H, 4.84; N, 6.73. The aqueous acidic layer was evaporated to dryness, made basic with 0.3 N ethanolic caustic, and the organic salts filtered off. The filtrate was concentrated, acidified with hydrochloric acid, and evaporated to dryness. The resultant acidic salts were triturated with 1:2-ethanol:benzene. On cooling the filtrate, 3.90 g. of a glassy paste formed whose infrared spectrum was consistent with hexanolamine hydrochloride. Benzoylation gave the benzamido derivative, melting point 105.5–106° C. Analysis found: C, 71.04; H, 8.49. Calculated for $C_{13}H_{19}NO_2$: C, 70.56; H, 8.65. The final product distribution was 50% diol and 36.5% amino alcohol at 93% conversion.

Example 3

A 600-ml. stainless steel rocker bomb was charged with 10.24 g. (0.075 mol) propylene chlorohydrin acetate, boiling point 152.9–153.4° C., $N_D^{20}=1.4220$, and 125 ml. (1.875 mols) of concentrated (28%) aqueous ammonia, and heated at 220° C. for three hours. The maximum pressure was 520 p.s.i.g. The bomb was cooled, 4.0 g. of sodium hydroxide was added, and the ammonia was removed at 50 mm. Titration of the residue indicated that it contained 0.060 mol propanolamine, 0.005 mol dipropanolamine, and 0.002 mol of tripropanolamine. This corresponds to 100% yields of amino alcohols at 100% conversion.

Example 4

A 600-ml. stainless steel rocker bomb was charged with 9.2 g. (0.075 mol) of ethylene chlorohydrin acetate, boiling point 145–146.3° C., $N_D^{20}=1.4232$, 125 ml. of 28% aqueous ammonia and heated at 220° C. for three hours. The bomb was cooled and 4.0 g. of sodium hydroxide added. Ammonia was removed at 100 mm. pressure. Titration of the aqueous products indicated a 100% conversion to mono-, di- and triethanolamine in the ratio of 4,4:1.0:0.7.

Example 5

Substantially the same conditions as in Example 2 were followed, except that 8.84 g. (0.05 mol) of trans-2-chlorocyclohexyl acetate, boiling point 100–100.2° C. at 12 mm., $N_D^{20}=1.4644$, and 83.3 ml. of 28% aqueous ammonia were charged to the bomb. The bomb was cooled, opened and the contents acidified to a 10 volume percent excess with concentrated hydrochloric acid. The aqueous acidic solution was continuously extracted with 150 ml. of chloroform for ten hours. The acidic layer was treated as in Example 2, yielding a total of 6.18 g. of trans-2-aminocyclohexanol hydrochloride (81% yield at 100% conversion). Further recrystallization from 1:2-ethanol:benzene gave 4.97 g. of pure material, melting point 169–172° C. Schotten-Baumann benzoylation gave an N-benzamido derivative, melting point 171.8–172° C. No cis - 2 - aminocyclohexanol hydrochloride was found. Evaporation of the chloroform extracts, followed by sublimation, gave 0.10 g. of cis-cyclohexanediol (2% yield).

Example 6

The procedure of Example 1 was repeated except that 5.0 g. (0.019 mol) of dodecene-1 chlorohydrin acetate, 31.6 ml. (0.475 mol) of 28% aqueous ammonia and 47 ml. of distilled tetrahydrofuran were charged. The bomb was heated at 220° C. for three hours. The maximum pressure was 560 p.s.i.g. The bomb was opened and ammonia and tetrahydrofuran evaporated off on the steam bath. The remaining solution was acidified to a 10 volume percent excess with concentrated hydrochloric acid and continuously extracted with 60 ml. of chloroform for eight hours. Evaporation of the chloroform layer gave a 70% yield at 82% conversion of a diol-aminoalkanol mixture, containing 13 mol percent dodecanolamine.

We claim:

1. Process for the preparation of a vicinal amino alcohol of 2 to 12 carbon atoms, which comprises heating at a temperature in the range 100° to 250° C. the chlorohydrin acetate of an unsubstituted olefin of 2 to 12 carbon atoms selected from the group consisting of mono-olefins and nonconjugated polyolefins, and aqueous ammonia in proportions calculated to provide at least 2 mols of ammonia for each mol of the chlorohydrin acetate, and aqueous ammonia having a concentration of about 5 to 28%, by weight ammonia.

2. Process according to claim 1, wherein the chlorohydrin acetate and ammonia are heated in the presence of an inert diluent.

3. Process according to claim 2, wherein the chlorohydrin acetate is derived from an alpha-olefin.

4. Process according to claim 3, wherein the alpha-olefin is of substantially straight-chain structure.

5. Process according to claim 4, wherein the alpha-olefin is derived from cracked petroleum wax.

6. In the process for preparing a vicinal amino alcohol of 2 to 12 carbon atoms by contacting at a temperature in the range 10° to 30° C. chlorine and an unsubstituted mono-olefin of 2 to 12 carbon atoms in approximately equimolecular proportions, in the presence of an acetoxylation catalyst comprising 1 to 7 mols of sodium acetate per mol of olefin, and 10 to 100 mols per mol of olefin of acetic acid containing 1 to 15 weight percent of water, whereby there is produced a crude reaction product mixture, including unreacted acetoxylation agent, and the dichloride, the chlorohydrin acetate and the diacetate of the olefin, the steps of removing unreacted acetoxylation agent, and then heating the resulting reaction mixture and aqueous ammonia at a temperature in the range 100° to 250° C., the aqueous ammonia being employed in amounts calculated to provide at least 2 mols of ammonia per mol of the chlorohydrin acetate, and having a concentration of about 5 to 28 percent by weight ammonia, and recovering the amino alcohol.

References Cited in the file of this patent

UNITED STATES PATENTS

| | | |
|---|---|---|
| 2,113,150 | Wiezevich | Apr. 5, 1938 |
| 2,160,138 | Gayor | May 30, 1939 |
| 2,971,989 | Lapporte et al. | Feb. 14, 1961 |

OTHER REFERENCES

Grimsson et al.: Acta Chem. Scand., vol. 4, pp. 719–724 (1950).

Bodendorf et al.: C.A., vol. 52, pp. 14562 (1958).